US009481799B2

United States Patent
Moffett

(10) Patent No.: US 9,481,799 B2
(45) Date of Patent: *Nov. 1, 2016

(54) TREATMENT OF TAILINGS STREAMS

(71) Applicant: THE CHEMOURS COMPANY FC LLC, Wilmington, DE (US)

(72) Inventor: Robert Harvey Moffett, Ladenberg, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,662

(22) Filed: Apr. 14, 2015

(65) Prior Publication Data
US 2015/0218386 A1 Aug. 6, 2015

Related U.S. Application Data

(63) Continuation of application No. 12/608,071, filed on Oct. 29, 2009, now Pat. No. 9,011,972.

(60) Provisional application No. 61/109,286, filed on Oct. 29, 2008.

(51) Int. Cl.
| B05D 7/00 | (2006.01) |
| C09D 1/00 | (2006.01) |
| C04B 28/24 | (2006.01) |
| C10G 1/04 | (2006.01) |

(52) U.S. Cl.
CPC ............. *C09D 1/00* (2013.01); *C04B 28/24* (2013.01); *C10G 1/045* (2013.01); *C10G 1/047* (2013.01); *C10G 2300/4006* (2013.01); *C10G 2300/44* (2013.01); *Y02W 30/91* (2015.05); *Y02W 30/93* (2015.05)

(58) Field of Classification Search
CPC .......... C09D 1/02; C09D 1/04; C09K 17/12; B09B 3/0041; C04B 28/24; C04B 28/26
See application file for complete search history.

(56) References Cited

U.S. PATENT DOCUMENTS

| 3,028,340 A | * | 4/1962 | Gandon | ............... C04B 24/008 |
| | | | | 106/156.3 |
| 3,330,757 A | | 7/1967 | Bichard | |
| 3,487,003 A | | 12/1969 | Baillie et al. | |

(Continued)

FOREIGN PATENT DOCUMENTS

| AU | 9739902 A | 4/1998 |
| BR | 7504773 A | 3/1977 |

(Continued)

OTHER PUBLICATIONS

Chaiko et al; Use of sol-gel systems for solid/liquid separation; Industrial and Engineering Chemical Research (1998) 27, 1071-1078.*

Kato, Study on the addition of an inorganic flocculant and a high polymer flocculant for wastewater treatment. Part 2. Treatment of wastewater containing suspended solids by flocculation and sedimentation (1981), 11(2), 43-52.

(Continued)

*Primary Examiner* — Micheal Wieczorek

(57) ABSTRACT

A process for the treating a mature fine tailings stream is provided. Treatment comprises contacting an alkali metal silicate or polysilicate microgel and an activator with mature fine tailings, entrapping the sand and clay fines within a polysilicate microgel, spreading the silica microgel over a surface, and allowing the silica microgel to dry, and producing a trafficable surface.

14 Claims, 1 Drawing Sheet

(56) References Cited

U.S. PATENT DOCUMENTS

| | | | | |
|---|---|---|---|---|
| 3,502,575 | A | * | 3/1970 | Hepp ............... B01D 36/04 210/196 |
| 3,723,310 | A | | 3/1973 | Lang et al. |
| 3,837,872 | A | * | 9/1974 | Conner ............. B09B 3/0041 106/611 |
| 3,953,317 | A | | 4/1976 | Myers et al. |
| 4,076,862 | A | * | 2/1978 | Kobeski ............ C09K 21/02 106/774 |
| 4,094,768 | A | * | 6/1978 | Fuller ............... C10G 1/02 208/391 |
| 4,229,295 | A | * | 10/1980 | Krofchak ........... C02F 11/008 210/723 |
| 4,270,609 | A | | 6/1981 | Choules |
| 4,338,185 | A | | 7/1982 | Noelle |
| 4,384,894 | A | | 5/1983 | Vickers et al. |
| 4,401,552 | A | | 8/1983 | Elanchenny et al. |
| 4,428,424 | A | | 1/1984 | Lacy et al. |
| 4,572,777 | A | | 2/1986 | Peck |
| 4,634,540 | A | | 1/1987 | Ropp |
| 4,675,120 | A | | 6/1987 | Martucci |
| 4,820,424 | A | | 4/1989 | Field et al. |
| 4,891,131 | A | | 1/1990 | Sadeghi et al. |
| 4,954,220 | A | | 9/1990 | Rushmere |
| 5,176,891 | A | | 1/1993 | Rushmere |
| 5,244,726 | A | | 9/1993 | Laney et al. |
| 5,276,247 | A | | 1/1994 | Engelhardt et al. |
| 5,730,882 | A | | 3/1998 | Gallup et al. |
| 6,153,103 | A | | 11/2000 | Chaiko et al. |
| 6,203,711 | B1 | | 3/2001 | Moffett |
| 6,936,087 | B2 | | 8/2005 | Wommack et al. |
| 7,048,859 | B1 | | 5/2006 | Moffett et al. |
| 7,070,696 | B2 | | 7/2006 | Weir et al. |
| 7,192,527 | B2 | | 3/2007 | Reddy et al. |
| 7,267,814 | B2 | | 9/2007 | McGill et al. |
| 7,670,593 | B2 | | 3/2010 | McGill et al. |
| 9,011,972 | B2 | * | 4/2015 | Moffett ............. C04B 28/24 427/136 |
| 2003/0025103 | A1 | | 2/2003 | Persson et al. |
| 2004/0069031 | A1 | | 4/2004 | Krysiak et al. |
| 2004/0144731 | A1 | | 7/2004 | Hartung et al. |
| 2005/0194292 | A1 | | 9/2005 | Beetge et al. |
| 2007/0267327 | A1 | | 11/2007 | Boakye |
| 2008/0099380 | A1 | | 5/2008 | Lahaie et al. |
| 2008/0110805 | A1 | | 5/2008 | Veltri et al. |
| 2008/0111096 | A1 | | 5/2008 | Veltri et al. |

FOREIGN PATENT DOCUMENTS

| | | |
|---|---|---|
| CA | 1252409 A | 4/1989 |
| CA | 1273888 A | 9/1990 |
| CA | 1275063 A | 10/1990 |
| CA | 2068895 A | 5/1993 |
| CA | 2159867 A | 4/1996 |
| CA | 2512324 A1 | 1/2007 |
| CA | 2581586 A1 | 9/2007 |
| CA | 2522031 A1 | 12/2007 |
| CN | 1517321 A | 8/2004 |
| CN | 101058451 A | 10/2007 |
| CN | 101108732 A | 1/2008 |
| CN | 101249501 A | 8/2008 |
| CN | 101327931 A | 12/2008 |
| EP | 575799 B1 | 12/1993 |
| EP | 621329 A1 | 10/1994 |
| FR | 2870229 A1 | 11/2005 |
| GB | 1019035 A | 2/1966 |
| IT | 1139858 B | 9/1986 |
| JP | 59033388 A | 2/1984 |
| JP | 62143817 A | 6/1987 |
| JP | 1995305061 A | 11/1995 |
| JP | 2001219006 A | 8/2001 |
| JP | 2003205205 A | 7/2003 |
| JP | 2006000837 A | 1/2006 |
| KR | 2008084241 A | 9/2008 |
| NL | 8402126 A | 2/1986 |
| RO | 87998 A | 10/1985 |
| RU | 2312880 C1 | 12/2007 |
| SU | 648597 B | 2/1979 |
| SU | 732507 A | 5/1980 |
| SU | 1399271 A | 3/1986 |
| SU | 1381076 A | 3/1988 |
| SU | 1047194 A | 12/1989 |
| SU | 1738360 A1 | 6/1992 |
| SU | 1779743 A1 | 12/1992 |
| SU | 1824418 A1 | 6/1993 |
| WO | 0071471 A1 | 11/2000 |
| WO | 03004831 A1 | 1/2003 |
| WO | 2005028592 A1 | 3/2005 |
| WO | 2006057719 A1 | 6/2006 |
| WO | 2006057723 A1 | 6/2006 |
| WO | 2006072294 A1 | 7/2006 |
| WO | 2007090099 A3 | 1/2008 |
| WO | 2008020907 A2 | 2/2008 |
| WO | 2008037593 A3 | 5/2008 |

OTHER PUBLICATIONS

Liu, et al. Study of kraft pulping wastewater treatment using coagulants and high-polymer flocculants, Huanjing Kexue (1981), 2(4), 261-264, 318.

Noda, Organic flocculant, and the mechanism of flocculation, Kobunshi (1968), 17(194), 404-412.

Akyel, New experiences with high—polymer synthetic flocculants to clarify and to dewater muds, Glueckhauf (1966) 102(8)), 364-368.

Castelijns, et al., Permeability reduction in porous materials by in situ formed silica gel, Journal of Applied Physics (2007), 102(11), 114901/1-114901/10.

Krysztafkiewicz, et al., New aspects in the precipitation of very fine silica fillers, Technologia Chemiczna na Przelomie Wiekow (2000), 261-264.

Himmel, Structural characterization of SiO2 aerogels, Journal of Non-Crystalline Solids (1995), 185(1,2), 56-66.

Kotlyar, et al., Understanding the fundamentals: key to process modifications for tailings reduction, Journal of Environmental Science and Health, Part A: Environmental Science and Engineering (1993), A28(10), 2215-2224.

Lapa, A new concept for tailings disposal, Light Metals (Warrendale, PA, United States) (1993), 45-49.

Sing, et al. The surface properties of silica gels. I. Importance of pH in the preparation from sodium silicate and sulfuric acid, Journal of Applied Chemistry (1953), 3, 549-556.

Joosten, New methods of sealing by use of material under pressure, Wasser and Abwasser (Leipzig) (1937), 35, 131-132.

Joosten, New methods of sealing by use of material under pressure, Deut. Wasserwirt. (1937), 47-54.

Yulin, et al. Development of Ammonium as a chemical grouting material, International Journal of Mine Water (1985) 4(3) 43-54.

U.S. Army Corps of Engineers, Chemical Grouting, Engineer Manual, ME 1110-1-3500 (Jan. 31, 1995).

Mikula, et al., Centrifuge options for production of "Dry stackable tailings" in surface mined oil sands tailings management, Canadian International Petroleum Conference Paper 2008-096, 1-7.

Chaiko, et al., Use of sol-gel systems for solid/liquid separation, Industrial and Engineering Chemical Research (1998) 37, 1071-1078.

Li, et al. Synergetic role of polymer flocculant in low-temperature bitumen extraction and tailings treatment, Energy & Fuels (2005) 19, 936-943.

Li, et al., Role of acidified sodium silicate in low temperature bitumen extraction from poor-processing oil sand ores, Industrial and Engineering Chemical Research (2005) 44, 4753-4761.

Edel'stein, Hydrocarbons, asphaltenes, and resins removable by silica gel in generator tar from Estonian shale, Trudy Inst. Goryuch. Iskopaemykh Akad. Nauk S.S.S.R. (1954) 3, 109-119.

Saladini, Refining shale oils with silica gel and with bauxite. II. Filtrations in liquid phase, Industria Chimica (Rome) (1930), 5, 1482-1487.

(56) References Cited

OTHER PUBLICATIONS

Saladini, Shale-oil refining by means of silica gel and bauxite, Industria Chimica (Rome) (1929), 4, 1132-1137.

Han, et al., Progress of flocculation applied to dyeing wastewater treatment, Gongye Shuichuli (2006), 26(9), 5-9.

Li, et al., Effect of high polymer flocculant on fractal structures of sediment aggregates, Shuichuli Jishu (2006), 32(10), 13-16.

Kuznetsova, Effect of calcium cation on the structure of silica gel formed from decationzed sol, Russian Journal of Applied Chemistry (Translation of Zhurnal Prikladnoi) (2001), 74(5), 855-859.

Hashida, Recent developments of polymeric flocculants. 1 Mizu Shori Gijutsu Kenkyukai (1997), 38(10), 499-506.

Kumar, Safe disposal of reactive flotation tailings and retorted fines of Eastern Oil Shale by an agglomeration process Fuel (1994), 73(9), 1472-1475.

Majid, et al. Characterization of syncrude sludge and pond tailings, Preprints of Papers—American Chemical Society, Division of Fuel Chemistry (1990), 35(2), 535-546.

Majid, Fractionation and characterization of Syncrude sludge pond tailings, Preprints of Papers—American Chemical Society, Division of Fuel Chemistry (1989), 34(4), 1453-1460.

\* cited by examiner

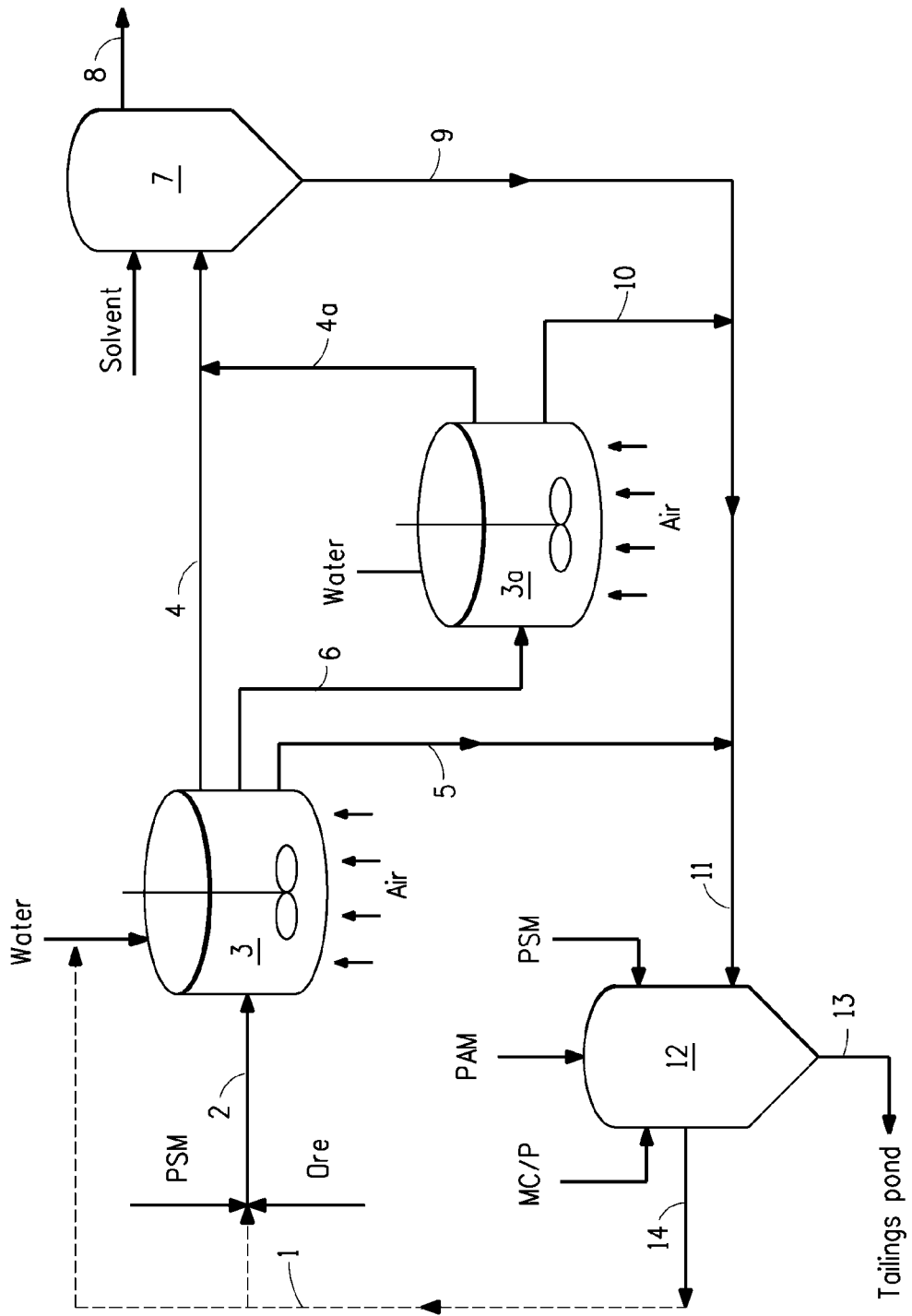

TREATMENT OF TAILINGS STREAMS

FIELD OF THE INVENTION

The present invention relates to a process for extraction of bitumen from oil sands, flocculation/dewatering of tailings after extraction, and treatment of tailings streams.

BACKGROUND OF THE INVENTION

Oil sands have become an attractive source of oil recovery to support global demand for oil. Oil sands are large deposits of naturally occurring mixtures of bitumen, water, sand, clays, and other inorganic materials found on the earth's surface. Bitumen is a highly viscous form of crude oil. The largest oil sands deposits are found in Canada and Venezuela. In particular, the Athabasca oil sands deposit is equivalent to 1.6 to 2.7 trillion barrels of oil, and is located in the Canadian provinces of Alberta and Saskatchewan. About 10% of the Athabasca oil sands deposit can be mined. Once the oil sands are mined, it is processed by extracting the bitumen.

The bitumen must be extracted and separated from the water, sand and fine clays of the oil sands. Today, the oil sands are mined, crushed, then mixed with hot water, and optionally chemicals, to facilitate extracting the bitumen from the sand and clay fines. The extracted bitumen is separated from the sands and fine clays and is then refined. The remaining sand, clays and water, commonly referred to as "tailings", are further processed to dewater the sand and clays. The sand and clay are typically disposed, e.g., in a tailings pond and settle to become mature fine tailings. Mature fine tailings are a stable slurry comprising fine clays and sands, silt, water, and bitumen. Mature fine tailings have no strength, no vegetative potential and may be toxic to animal life, so must be confined and prevented from contaminating water supplies. The recovered water from the dewatering step may be re-used in the extraction process. Faster recovery of the water reduces heat energy requirements when this water is recycled for use in the extraction process.

The recovered bitumen from this process is in the form of a froth. The froth comprises a concentrated bitumen (typically 50% or greater), water, fine clays and sands. The froth is treated in a froth treatment unit, which may use steam (to de-aerate the froth) and a naphthenic or paraffinic solvent to recover a bitumen with greater than 95% purity. A byproduct of the froth treatment process is a froth treatment tailings. The froth treatment tailings comprise water, residual solvent, and fine solids that are primarily smaller than 44 micrometers in size. The froth treatment tailings are typically disposed of in a tailings pond. Froth treatment tailings contribute to mature fine tailings formation.

Tipman et al., in U.S. Pat. No. 5,876,592, disclose recovery of bitumen from oil sands in a process comprising adding aqueous caustic to an oil sands slurry, to create an emulsion. The emulsion is allowed to separate into 3 layers, with a top layer of a first froth comprising bitumen, bottom layer, referred to as tailings, comprising water, sand and clay fines that settled, and a middle layer, referred to as middlings, comprising residual bitumen, suspended clay fines and water. The middlings are further processed to recover additional bitumen in the same manner as the oil sands slurry, producing a second froth. The second froth may be combined with the first froth to recover bitumen by dilution with a solvent and removal of sand and clay fines.

Yuan, et al., *Canadian Metallurgical Quarterly,* 2007, vol. 46, no. 3 pp. 265-272, disclose using a multiple-step process, in a particular sequence, for removing sands and fine clays from tailings. The first step is referred to as flocculation-coagulation-flocculation (FCF), in which a flocculant is added. This allows for the flocculation of larger particles leaving fines in solution. In the second step, a coagulant is added. The coagulant destabilizes the fines causing small flocs to form. In the third step, a small amount of flocculant is added to combine the larger flocs from the first step with the smaller flocs in the second step, resulting in even larger flocs and an increase of settling rates, allowing for faster dewatering.

Acidified silicate has been used to enhance bitumen extraction by Masliyah, *Ind. Eng. Chem. Res.,* 2005, vol. 44, pp. 4753-4761. By acidifying the silicates, divalent metal ions can be sequestered allowing for improved bitumen liberation while maintaining consistent pH. There is a similar disadvantage with this process as found in WO 2005/028592, that is, solids are dispersed.

Li, *Energy & Fuels,* 2005, vol. 19, pp. 936-943 disclose the effect of a hydrolyzed polyacrylamide (HPAM) on bitumen extraction and tailings treatment of oil sands ores. Careful control of HPAM dosage is necessary to achieve efficiency in both bitumen extraction and in flocculation of solid fines.

Chaiko et al., in U.S. Pat. No. 6,153,103, disclose a method to separate and recover ultra fine particles and soluble salts from a dilute process streams using sodium silicates and organic gelling agents through syneresis process. This method is used for dilute solutions and for solids to silicate ratios of 0.4:1 or less.

Separation of bitumen from sand and clay fines, as well as dewatering of the sand and clay fines for disposal, are especially difficult for so-called "poor quality ores." Generally, a poor quality ore, in reference to an oil sands ore is an oil sands ore that contains a large amount of fines that hinder, not only extraction of bitumen, but also the dewatering process of sand and clay fines. Poor quality ores are difficult to extract bitumen from at acceptable yields using conventional methods. In addition, more bitumen is retained in the tailings streams from extraction of poor quality ores, which is sent to the tailings pond as a yield loss.

Poor quality ores reduce yield by as much as 35 to 50% and are avoided when possible. Alternatively, poor quality ores are blended in limited quantities with good quality ores so they can be processed more effectively. With demand for oil increasing every year, there is a need to mine these poor quality ores and to produce high yield of bitumen. The tailings should be essentially free of bitumen and separated from water, so the water can be re-used and the solids can be returned to the environment free of bitumen, within environmental limits.

There is a desire to have lower extraction temperatures (for example, less than about 50° C.) to save heat energy. For example, when an adjacent upgrading facility to treat the extracted bitumen is not available, there is added cost to supply heat energy for the extraction water.

Mature fine tailings ponds also pose an environmental concern. Often disposal of the tailings creates ponds where the clays and fines remain suspended in water and ultimately become mature fines tailings. The Energy Resources Conservation Board of Canada has issued Directive 074, which mandates a reduction of fine tailings ponds and the formation of trafficable deposits for all oil sands operators. Currently, these mature fine tailings are treating with gypsum/lime and centrifuging. Gypsum/lime treatment is undesirable due to the added calcium ions in and around the tailings pond and the remaining solids are too soft to be trafficable for long periods of time. Centrifuging is undesirable due to the large capital investment and having to transport the mature fine tailings to centrifuge locations.

While there have been many advances in the oil sands extraction and tailings, there remains a need to improve bitumen recovery (yield) from oil sands, improve de-watering of the tailings (i.e., less water in the tailings) and reduce need to add fresh water bitumen recovery processes. There is also a need to improve bitumen extraction in poor quality ores, and to do so without significant capital equipment, without significant bitumen yield loss. There is also a need to reduce or eliminate mature fine tailings ponds where the remaining solid can be useful. The present invention meets these needs.

SUMMARY OF THE INVENTION

The present invention is a process for the extraction/recovery of bitumen from oil sands and for the treatment of tailings. In one embodiment of this invention, the process comprises (a) providing an aqueous slurry of an oil sands ore and (b) contacting the slurry with a polysilicate microgel to produce a froth comprising bitumen and a tailings stream comprising sand and clay fines. Preferably, the process further comprises (c) dewatering the tailings. Bitumen is recovered from the froth. Optionally, an anionic polyacrylamide and/or caustic, such as sodium hydroxide, sodium silicate, sodium citrate, may be added after step (b) and prior to step (c). Alternatively, a polyacrylamide and one or both of (i) a multivalent metal compound and (ii) a low molecular weight cationic organic polymer may be added after step (b) and before step (c). Surprisingly, the process improves recovery of bitumen and does not adversely affect flocculation of tailings as compared to use of sodium silicate instead of polysilicate microgel. The polysilicate microgel is carried through to a dewatering step and may enhance flocculation in said tailings.

In an alternative embodiment of this invention, there is a process for treating a tailings stream comprising water, sand and clay fines to flocculate the sand and clay fines wherein the process comprises (a) contacting a polysilicate microgel, an anionic polyacrylamide and one or both of (i) a multivalent metal compound and (ii) a low molecular weight cationic organic polymer with the tailings stream to produce a flocculated solid, and (b) separating the flocculated solid from the stream. Unexpectedly and advantageously, in this second embodiment, flocculation is enhanced compared to use of polyacrylamide alone.

In a third alternative embodiment of this invention, there is a process for the treating a tailings stream comprising (a) contacting a silicate source and an activator with said tailings stream, (b) entrapping the fine clay and sand within a silica gel, (c) spreading the silica gel over a surface, and (d) allowing the silica gel to dry, to produce a trafficable surface, wherein the silicate source is an alkali metal silicate, polysilicate microgel, or combinations thereof and wherein the tailings stream comprises water, fine clays and sands, wherein 20% by volume to about 100% by volume of the fine clays and sand have a particle size less than 0.05 mm. Optionally, the tailings stream further comprises polysilicate microgels. Optionally the treated tailings produced after step (b) can be centrifuged or subjected to other known dewatering techniques prior to spreading the entrapped fine clays and sand over a surface.

BRIEF DESCRIPTION OF THE FIGURE

FIG. 1 is a process flow diagram of a bitumen extraction process and tailings flocculation in accordance with this invention.

DETAILED DESCRIPTION OF THE INVENTION

In a first embodiment of this invention, there is provided a process for the recovery of bitumen from oil sands which comprises providing an aqueous slurry of an oil sands ore and contacting the slurry with a polysilicate microgel to improve bitumen separation, producing a froth and a tailings. A slurry of an oil sands ore may be produced by mining an oil sands ore, crushing the ore and adding water to produce a slurry. Optionally, an anionic polyacrylamide and/or caustic, such as sodium hydroxide, sodium silicate and sodium citrate, may be added to the combination of oil sands ore and microgel. The froth comprises bitumen, clay fines and water. The tailings comprise sand, clay fines, unreacted polysilicate microgel and water. Preferably the process further comprises dewatering the tailings. The polysilicate microgel in the tailings may be carried through with the water to a dewatering step, wherein the microgel may enhance flocculation in the tailings.

In an alternative embodiment, there is provided a process for the flocculation of a tailings stream wherein the tailings stream is produced from an oil sands ore and comprises water, sand and clay fines. This process comprises contacting the tailings stream with a polysilicate microgel, an anionic polyacrylamide and one or both of a multivalent metal compound and low molecular weight cationic organic polymer to flocculate the solids.

In a third alternative embodiment of this invention, there is a process for treating a tailings stream comprising (a) contacting a silicate source and an activator with said tailings stream, (b) entrapping the fine clay and sand within a silica gel, (c) spreading the silica gel over a surface, and (d) allowing the silica gel to dry to produce a trafficable surface, wherein the silicate source is an alkali metal silicate, polysilicate microgel, or combinations thereof and wherein the tailings stream comprises water, fine clays and sands, wherein 20% by volume to about 100% by volume of the fine clays and sand have a particle size less than 0.05 mm. Optionally, the tailings stream further comprises polysilicate microgels. Optionally the treated tailings from step (b) can be centrifuged or subjected to other known dewatering techniques prior to spreading the entrapped fine clays and sand over a surface.

Oil Sands Ore

Oil sands ores are large deposits of naturally occurring mixtures comprising bitumen, sand, clays, and other inorganic materials. Herein, bitumen refers to hydrocarbons and other oils found in oil sands, tar sands, crude oil and other petroleum sources. The oil sands ores used in this invention are mined materials and typically comprise about 5 to 15 wt % bitumen. The oil sands ores further comprise water, sand and clay fines. Generally the oil sands ores comprise about 2 to 5 wt % water.

Inorganic material can be naturally-occurring ores, such as titanium ores and zirconium ores that are present in the oil sands ore.

The process of this invention may be used advantageously to treat poor quality ores. The "poorer" the quality of the oil sands ore, the higher the level of clay fines. Surprisingly, the process of this invention is effective at extracting bitumen from poor quality oil sands ores, while effectively dewatering the tailings streams.

Poor quality ores are defined herein as an oil sands ore which has one or more of the following properties: (a) levels of clay fines of greater than 15%; (b) montmorillonite clay in an amount greater than 1 wt % of the total weight of the oil sands ore, (c) greater than 10 ppm of calcium, magnesium; and (d) ores less than 25 meters from the earth's surface that have been subject to oxidation.

Polysilicate Microgel

The process of this invention comprises contacting a polysilicate microgel with an oil sands ore. Polysilicate microgels are aqueous solutions which are formed by the partial gelation of an alkali metal silicate or a polysilicate, such as sodium polysilicate. The microgels, which can be referred to as "active" silica, in contrast to commercial colloidal silica, comprise solutions of from 1 to 2 nm diameter linked silica particles which typically have a surface area of at least about 750 $m^2/g$. Polysilicate microgels are commercially available from E. I. du Pont de Nemours and Company, Wilmington, Del.

Polysilicate microgels have $SiO_2:Na_2O$ mole ratios of 4:1 to about 25:1, and are discussed on pages 174-176 and 225-234 of "The Chemistry of Silica" by Ralph K. Iler, published by John Wiley and Sons, N. Y., 1979. General methods for preparing polysilicate microgels are described in U.S. Pat. No. 4,954,220, the teachings of which are incorporated herein by reference.

Polysilicate microgels include microgels that have been modified by the incorporation of alumina into their structure. Such alumina-modified polysilicate microgels are referred as polyaluminosilicate microgels and are readily produced by a modification of the basic method for polysilicate microgels. General methods for preparing polyaluminosilicate microgels are described in U.S. Pat. No. 4,927,498, the teachings of which are incorporated herein by reference.

Polysilicic acid is a form of a polysilicate microgel and generally refers to those silicic acids that have been formed and partially polymerized in the pH range 1-4 and comprise silica particles generally smaller than 4 nm diameter, which thereafter polymerize into chains and three-dimensional networks. Polysilicic acid can be prepared, for example, in accordance with the methods disclosed in U.S. Pat. No. 5,127,994, incorporated herein by reference.

In addition to the above-described silica microgels, the term "polysilicate microgels" as used herein, includes silica sols having a low S value, such as an S value of less than 50%. "Low S-value silica sols" are described in European patents EP 491879 and EP 502089. EP 491879 describes a silica sol having an S value in the range of 8 to 45% wherein the silica particles have a specific surface area of 750 to 1000 $m^2/g$, which have been surface modified with 2 to 25% alumina. EP 502089 describes a silica sol having a molar ratio of $SiO_2$ to $M_2O$, wherein M is an alkali metal ion and/or an ammonium ion of 6:1 to 12:1 and containing silica particles having a specific surface area of 700 to 1200 $m^2/g$.

Polyacrylamide

Polyacrylamides (PAMs) useful in the present invention include anionic, cationic, non-ionic and amphoteric polyacrylamides. Polyacrylamides are polymers formed by polymerization of acrylamide, $CH_2=CHC(O)NH_2$. Polyacrylamides of the present invention typically have a molecular weight greater than one million.

Preferably the PAM is an anionic polyacrylamide (APAM) or cationic polyacrylamide (CPAM). APAM and CPAM are the generic names for a group of very high molecular weight macromolecules produced by the free-radical polymerization of acrylamide and an anionically or a cationically charged co-monomer. APAM and CPAM can be prepared by techniques known to those skilled in the art, including but not limited to the Mannich reaction. Both the charge density (ionicity) and the molecular weight can be varied in APAM and CPAM. By varying the acrylamide/ionic monomer ratio, a charge density from 0 (nonionic) to 100% along the polymer chain can be obtained. The molecular weight is determined by the type and concentration of the reaction initiator and the reaction parameters.

Low Molecular Weight Cationic Organic Polymers

Low molecular weight cationic organic polymers which can be used in this invention have a number average molecular weight less than 1,000,000. Preferably, the molecular weight is in the range between about 2,000 to about 500,000, more preferably between 10,000 and 500,000. The low molecular weight polymer is typically selected from the group consisting of polyethylene imine, polyamine, polycyandiamide formaldehyde polymer, diallyl dimethyl ammonium chloride polymer, diallylaminoalkyl(meth)acrylate polymer, dialkylaminoalkyl(meth)acrylamide polymer, a copolymer of acrylamide and diallyl dimethyl ammonium chloride, a copolymer of acrylamide and diallylaminoalkyl (meth)acrylate, a copolymer of acrylamide and dialkyl-diaminoalkyl(meth)acrylamide, and a copolymer of dimethylamine and epichlorohydrin. Such polymers are described, for example, in U.S. Pat. Nos. 4,795,531 and 5,126,014. Low molecular weight cationic organic polymers are commercially available, for example, from SNF Floerger, Andrézieux, France as FLOQUAT FL 2250 and FLOQAUT FL 2449 and from FCT-Water Treatment, Greeley, Colo. as WT-530.

Multivalent Metal Compounds

Multivalent metal compounds useful in the present inventive process are compounds of metals with more than one valence state. Examples of multivalent metals include calcium, magnesium, aluminum, iron, titanium, zirconium and combinations thereof. Preferably, the multivalent metal compound is soluble in water and is used as an aqueous solution. Examples of suitable multivalent metal compounds include calcium chloride, calcium sulfate, calcium hydroxide, aluminum sulfate, magnesium sulfate, and aluminum chloride, polyaluminum chloride, polyaluminum sulfate, and aluminum chlorohydrate. Preferably the multivalent metal compound is calcium sulfate, aluminum sulfate, polyaluminum sulfate, polyaluminum chloride, aluminum chlorohydrate. Compounds of multivalent metals that are polymerized are especially useful in the present invention.

Activator

Activators in the current invention comprise any compound or mixture of compounds that will initiate gelation of the alkali metal silicates. Activators can include acids, alkaline earth metal and aluminum salts, and organic esters, dialdehydes, organic carbonates, organic phosphates, amides, and combinations thereof. Examples of acids useful as activators include, but not limited to, sulfuric acid, carbon dioxide, phosphoric acid, sodium phosphate, sodium bicarbonate, hydrochloric acid, sodium hydrogen sulfate, and acetic acid. Examples of alkaline earth metal and aluminum salts include, but not limited to, calcium chloride, calcium oxide, calcium carbonate, calcium sulfate, magnesium sulfate, magnesium chloride, aluminum sulfate, sodium aluminate. Examples of organic esters, dialdehydes, organic carbonates, organic phosphates, and amides include, but not limited to, acetic esters of glycerol, glyoxal, ethylene carbonate, propylene carbonate, and formamide. Preferably, the activator is an acid, an alkaline earth metal salt, or combinations thereof. Preferred acids are sulfuric acid or carbon dioxide. Preferred alkaline earth metal salts are calcium sulfate and calcium chloride. One or more activators may be used.

Extraction and Flocculation

Oil sands ores are generally mined from the earth and processed to remove the bitumen, which can then be further treated as a crude oil. In a first embodiment, an oil sands ore is provided. The oil sands ore is mined from an oil sand deposit and crushed to provide a material suitable for extracting bitumen from the ore. Conventional methods can be used for mining and crushing. The oil sands ore is generally processed as an aqueous slurry. Recycled water from downstream dewatering step vida infra may be used to prepare the oil sands ore aqueous slurry.

The process of this invention comprises providing an aqueous slurry of an oil sands ore and contacting the slurry with a polysilicate microgel to extract bitumen from the oil sands ore. Water and optionally air may be added to the slurry prior to or during this contacting (extraction) step at a temperature in the range of 25 to 90° C. (77 to 194° F.), preferably at a temperature of 35 to 85° C. (95 to 185° F.). Advantageously the contacting step is performed at a temperature of 50° C. or less, for example, 35-50° C. (95-122° F.).

The amounts of the slurry components can vary. An aqueous slurry of an oil sands ore can be prepared by contacting an oil sands ore with water in an amount of 10% to 500%, based on the mass of the ore, preferably, 50% to 200%. The water may be recycled water from the extraction process. The amount of water added may be determined by extraction efficiency and by limitations of transfer lines used to convey the ore-containing slurry effectively through an extraction unit operation.

The polysilicate microgel is typically added in an amount of 25 to 5000 g per metric ton of the oil sands ore.

One ore more of the following additives may be added to the oil sands ore slurry prior to contacting with the polysilicate microgel (extraction step (b)): anionic polyacrylamide and other polymeric flocculants and coagulants; caustics such as sodium hydroxide, sodium silicate, and sodium citrate; organic acids and salts of organic acids, such as glycolic acid and sodium glycolate, surfactants, buffers such as bicarbonates, and antimicrobial agents.

In the extraction step (b), the oil sands ore, microgel and water are mixed and optionally contacted with air, generally in the form of air bubbles, in a reaction vessel or in a transport line. Contact of the air bubbles with the slurry results in bitumen floating to the top of the slurry, creating a top layer, referred to as a froth, or a first froth, if multiple froths are produced in the process. The (first) froth comprises bitumen that has floated to the top of the slurry, and also comprises clay fines.

After forming a froth, the remainder of the slurry is permitted to separate in the reaction vessel or is transferred from a transport line to a separating vessel. The majority of the sand and clay fines settle to the bottom of the slurry forming a bottom layer, referred to as a coarse tailings. A middle layer is also formed in the slurry. The middle layer is a diluted portion of the slurry comprising bitumen that did not float to the top and sand and clay fines that did not settle to the bottom, and is referred to as middlings.

The middlings may be removed from the middle of the reaction or separation vessel. The removed middlings may be further processed by contacting with air as air bubbles or passing through one or more air flotation cells, where air bubbles enhance separation of the bitumen droplets from the solids (sand and clay fines) and water of the middlings, producing a (second) froth. The second froth may be recovered e.g., from the air flotation cell(s), and may be combined with a first froth. Polysilicate microgel may be added at this process step, typically in an amount of 25 to 5000 g per metric ton of the oil sands ore. Alternatively, the second froth may be added to the slurry comprising the oil sands ore and water prior to treating the slurry to produce the first froth.

After forming the second froth, the remainder of the slurry is permitted to separate in the reaction vessel or is transferred to a separating vessel. The majority of the sand and clay fines settle to the bottom of the slurry forming a bottom layer, referred to as a fine tailings, which comprise less sand and more fines than coarse tailings. A middle layer may also form in the slurry. Both the middle and bottom layers may be combined and treated downstream in a dewatering step as fine tailings.

Optionally, the middle layer that is formed with the second froth is removed as a second middlings and further treated with air in the same manner as the (first) middlings, that is, treated with air to produce a third froth. The third froth may be combined with the first froth and second froth to recover bitumen. The third froth may added to the slurry comprising the oil sands ore and water prior to producing first froth, optionally being combined with the second froth. In still another alternative, the third froth may be combined with the middlings prior to contacting the middlings with air. A second fine tailings is also produced with the third froth.

Each successive formation of a froth removes more of the bitumen from the oil sands ore. Although producing only up to a third froth is described herein, successive froths (fourth, fifth, etc.) are contemplated within the scope of this invention.

The process may further comprise removing the froth from the top of the slurry in the extraction step(s) and transferring the froth to a froth treatment unit. In the froth treatment unit, the froth is contacted with a solvent to extract the bitumen from the froth and to concentrate the bitumen. Typically the solvent is selected from the group consisting of paraffinic $C_5$ to $C_8$ n-alkanes and naphthenic solvents. Naphthenic solvents are typically coker naphtha and hydrotreated naphtha having an end boiling point less than 125° C. A by-product from froth treatment unit is froth treatment tailings, which comprise very fine solids, hydrocarbons and water.

After treatment of the froth in the froth treatment unit, the concentrated bitumen product may be further processed to purify the bitumen.

The froth treatment tailings may be further treated in a dewatering step to remove water, which may be recycled in the process, from the solids which comprise clay fines and sand.

The process may further comprise dewatering tailings. The tailings can be one or more of any of the tailings streams produced in a process to extract bitumen from an oil sands ore. The tailings is one or more of the coarse tailings, fine tailings and froth treatment tailings. The tailings may be combined into a single tailings stream for dewatering or each tailings stream may be dewatered individually. Depending on the composition of the tailings stream, the additives may change, concentrations of additives may change, and the sequence of adding the additives may change. Such changes may be determined from experience with different tailings streams compositions.

The tailings stream comprises at least one of the coarse tailings, fine tailings and froth treatment tailings. This dewatering step comprises contacting the tailings stream with polyacrylamide and one or both of (i) a multivalent metal compound and (ii) a low molecular weight cationic organic polymer. The tailings stream may comprise polysilicate microgel from the extraction steps. Additional polysilicate microgel may be added as necessary. Polysilicate microgels enhance the flocculation of the sand and clay fines in the dewatering step by providing a better separation of solids from water and/or an increased rate of separation of the solids from water and/or permitting a range of operating conditions for the dewatering step which can be tolerated while still achieving a desired level of separation of solids from water within a desired period of time.

Dewatering may be accomplished by means known to those skilled in the art. Such means include use of thickeners, hydrocyclones and/or centrifuges, or by decantation and/or filtration. The dewatered solids should be handled in compliance with governmental regulations. The separated water may be recycled to the process ("recycled water"). For example, the recycled water may be added to crushed oil sands ore for bitumen extraction. Recycled water may also be added to the process at any point where water is added.

Conventionally fine tailings and froth treatment tailings have been difficult to dewater effectively. Both comprise clay fines and unextracted bitumen. Such tailings after dewatering, have been sent to tailings pond and after time become mature fine tailings. In the present invention, separation of solids from even the fine tailings and froth treatment tailings is improved.

In alternatives to the process of this invention, there is a process to extract bitumen from a slurry comprising bitumen wherein the process comprises providing a slurry comprising bitumen, wherein the slurry is a middlings, a fine tailings or a froth treatment tailings, contacting the slurry with a polysilicate microgel to extract bitumen from the slurry, and produce a froth comprising bitumen and tailings. Preferably the tailings are dewatered. The contacting, extracting and dewatering steps are performed as described hereinabove.

The processes of this invention can be used to treat poor quality ores. Alternatively, a higher percentage of poor quality ores may be blended with good quality ores in the extraction and dewatering processes of this invention.

In a second embodiment of this invention, there is provided a process for treating a tailings stream comprising sand, clay fines and water, which process comprises (a) contacting the tailings stream with a polysilicate microgel, an anionic polyacrylamide, and one or both of a multivalent metal compound and a low molecular weight cationic organic polymer to produce flocculated solids; and (b) separating the flocculated solids from the stream. The separating step may be by dewatering. In this process, the sand and clay fines are flocculated to produce flocculated solids. In the separating step, the flocculated solids are separated from the stream, e.g., by dewatering to provide the solids and a recovered water.

The tailings stream may be a coarse tailings, fine tailings, froth treatment tailings or a combination of two or more thereof. Processes to produce such tailings streams are described hereinabove, with the exception that, in this embodiment, no polysilicate microgel is added in the extraction process. Therefore, tailings streams applicable to this embodiment can be produced from conventional oil sands processes for bitumen extraction. For example, the tailings stream treated herein can be a slurry comprising clay fines recovered from an oil sands solvent recovery unit. Still further, as an alternative, the tailings stream may be a mature fine tailings that has been removed from a tailings pond.

In the separating step, the objective is to flocculate and dewater the solids, while enabling recovery of as much water as possible. Surprisingly in the present invention, a faster separation rate and more complete separation of the solids from the water has been achieved. Thus the present invention has an improved process efficiency relative to conventional processes for treating tailings streams.

Solids may be disposed of, sent to a tailings pond for additional settling or, when solids are a concentrated source of minerals, such as titanium and zirconium minerals, the solids may be used as a raw material or feed to produce for example, titanium and zirconium compounds for commercial products.

Order of addition of polysilicate microgel, anionic polyacrylamide and one or both of a multivalent metal compound and a low molecular weight cationic organic polymer may be varied to induce certain desired effects. For example, the multivalent metal compound and/or low molecular weight cationic organic polymer may be added first and then the polyacrylamide may be added to the tailings stream, that is, first add metal compound, then add polymer. In an alternative method, the following addition sequence is used: (1) a first polymer, which is a polyacrylamide, then (2) a multivalent metal compound and/or low molecular weight cationic organic polymer, then (3) a second polymer, which is a polyacrylamide, are added in that sequence to the tailings stream. The first and second polymer may be the same or different polymers. For example, both the first and second polymers may be polyacrylamide; however the first polymer is an anionic polyacrylamide and the second may be a cationic polyacrylamide. In either of the addition methods disclosed, polysilicate microgel may be added at any point. That is, the microgel may be added prior to or after addition of anionic polyacrylamide and multivalent metal compound and/or low molecular weight cationic organic polymer, that is, prior to or after additions of (1), (2) and (3).

Dewatering may be accomplished by means known to those skilled in the art to separate the solids from the process water. Such means include thickener, hydrocyclone, centrifuge, decanting, and filtration. The dewatered solids should be handled in compliance with governmental regulations.

It has been surprisingly found that polysilicate microgels enhance the flocculation of the sand and clay fines in the dewatering step of tailings produced in the extraction of bitumen from oil sand ores relative to known processes which use polyacrylamide alone and polyacrylamide in combination with metal salts. Specifically, in the processes of this invention, solids separate from water at faster rates than known processes. In addition, a higher percentage of water is recovered from the processes and the recovered water can be recycled to the process.

It is desirable to recycle water to oil sands ore extraction and recovery processes in order to minimize the need to use fresh water as make-up in the processes. The recycled water may be added to crushed oil sand ore to produce a slurry for bitumen extraction. Alternatively, if recovered water is in excess of what is needed for the process, the water may be returned to the environment if the water meets local standards.

Still further, relative to known processes which use sodium silicate, the addition of polysilicate microgel during the extraction steps, does not adversely affect the dewatering step, that is, it has been reported that the presence of sodium silicate retards flocculation and separation of solids from the tailings streams. Surprisingly in this invention, the addition of polysilicate microgel does not have a similar effect as sodium silicate. Use of sodium silicate also reduces water volume that is recovered and slows the rate of separation of solids from water relative to use of polysilicate microgels.

The processes of the present invention are robust and can be used to achieve desired levels of bitumen extraction and water recovery from both good and poor quality ores. Furthermore, the present invention provides a simpler separation process overall, reducing equipment, for example, eliminating the need for mechanical separation equipment. Still further the processes of the present invention may be used to treat fine tailings, to recover bitumen from such tailings, and to provide a mineral source, reducing the need for settling ponds.

Treatment of Tailings Stream

In a third alternative embodiment of this invention, there is a process for the treating a tailings stream comprising (a) contacting a silicate source and an activator with said tailings stream, (b) entrapping fine clay and sand within a silica gel, (c) spreading the silica gel over a surface, and (d) allowing the silica gel to dry to produce a trafficable surface, wherein the silicate source is an alkali metal silicate, polysilicate microgel, or combinations thereof and wherein the tailings stream comprises water, fine clays and sands, wherein 20% by volume to about 100% by volume of the fine clays and sand have a particle size less than 0.05 mm. Optionally, the tailings stream further comprises polysilicate microgels. Optionally the treated tailings can be centrifuged or subjected to other known dewatering techniques prior to step (c) spreading the entrapped fine clays and sand over a surface.

The tailings stream comprises water, sand, and clay fines and optionally polysilicate microgels. These tailings stream may be from a tailings ponds produced from fine tailings and froth treatment tailings that have been dewatered and deposited into the ponds and allowed to settle over time. The tailings stream may also be from a bitumen recovery process as a fresh tailings. Fresh tailings are generally thickened with polyacrylamides and may include sand and/or polysilicate microgels producing a tailings stream. The tailings stream can also contain residual polysilicate microgels from the bitumen recovery process.

The process for the treating a tailings stream comprising contacting a silicate source and an activator with said tailings stream may be adjusted to vary gelation times. Adjustments include, but not limited to, varying the order of addition and/or concentration of the silicate source and/or activators. For example, adding an increase of alkali metal silicate to a tailings stream may decrease yield stress over a short term (0.5 to 30 hours) but may result in a similar or larger increase in overall yield stress after time. Gelation time can also be varied by making adjustments to pH, by varying the order of addition and/or concentration of activator or activators relative to the silicate source.

The tailings stream are contacted with a silicate source and one or more activators, and optionally polysilicate microgels, and form a silica gel structure. Polysilicate microgels are as described above. Once dry, the gel becomes a hard solid with a trafficable surface. The process may be adjusted to control the gelation time. Gelation time is the time needed for the silicate source to form a solid, gel-like structure. Preferably, the tailings stream is contacted with a silicate source and an activator prior to being applied to a surface where gelation occurs forming a thin, solid surface which is trafficable. This process of applying the product of contacting a tailings stream with a silicate source and an activator to a surface may be repeated numerous times, producing a lift of several layers of hard, solid silica gel that encompass the sand and clay fines of the tailings stream.

Ideally, silica entrapped tailings formed from this process, are spread on a sloped surface and allowed to dry. Drying occurs by air drying (evaporation), water run off, or both. If water run off occurs, one may recover the water from this process and recycle the run off water, such as for re-use of the recovered water in either bitumen extraction or in the flocculation of the tailings streams discussed infra.

The process of treating tailings stream can occur in various ways. The silicate source and activator can be added directly to the tailings stream in a tailings ponds and the water is allowed to evaporate. The tailings stream, silicate source, and activator can be mixed in a vessel and spread on a surface and allowed to dry. The tailings stream, silicate source and activator can be mixed and centrifuged to enhance separation with a reduced amount of silicate source and activator needed. Preferably, the silicate source, activator, and tailings stream may be combined in a transfer line prior to being spread on a surface and allowed to dry.

In a fourth embodiment of this invention, there is a process for the treating a tailings stream comprising contacting an alkali metal silicate with said tailings stream. Adding alkali metal silicate alone allows the reduction of solids concentration without gelation of the mixture. This is useful for treating of tailings streams where residual bitumen remains in the tailings stream. Adding alkali metal silicate alone will further disperse the suspend solids and enhance releasing of the residual bitumen. It is also useful for instances where a solid product is not immediately needed, possibly for transportation to a location, where future treatment or storage can occur. The enhancement of bitumen recovery and reduction of solids by the addition of silicate will also occur at higher pH levels, by adding a caustic or by using lower ratios of the alkali metal silicate.

The processes of the present invention are robust and can be used to achieve desired levels of bitumen extraction and water recovery from both good and poor quality ores. Furthermore, the present invention provides a simpler separation process overall, reducing equipment, for example, eliminating the need for mechanical separation equipment. Still further the processes of the present invention may be used to treat fine tailings, to recover bitumen from such tailings, and to provide a mineral source, reducing the need for settling ponds.

DETAILED DESCRIPTION OF THE DRAWING

FIG. 1 is a process flow diagram of a bitumen extraction process and process for tailings flocculation in accordance with this invention.

Polysilicate microgel (PSM) and crushed oil sands ore (Ore) are combined in pipeline 1 and transferred as feed 2 to mixing vessel 3. Water is added to mixing vessel 3, producing a slurry. Air is added to slurry in mixing vessel 3 to produce (1) first froth 4, which comprises bitumen and separates from the slurry to the top of mixing vessel 3; (2) coarse tailings 5, which comprises the majority of sand and clay fines from feed 2, and separates to the bottom of mixing vessel 3; and (3) middlings 6, which comprises bitumen, clay fines and sand, and is the middle layer in mixing vessel 3.

First froth 4 is transferred to froth treatment vessel 7. Solvent is added to treatment vessel 7 to extract bitumen 8 from first froth and also produce froth treatment tailings 9 in treatment vessel 7. Bitumen 8 is transferred from treatment vessel 7 for further processing. Froth treatment tailings 9 comprises water and clay fines, and is further treated with other tailings streams.

Middlings 6 are removed from the middle of mixing vessel 3 and transferred to second mixing vessel 3a. Water is added to second mixing vessel 3a. Air is added to second mixing vessel 3a to produce second froth 4a, which comprises bitumen, clay fines and water and separates from middlings 6 to the top of mixing vessel 3a, and fine tailings 10, which comprises sand, clay fines and water and separates to the lower part of mixing vessel 3a. Second froth 4a is combined with first froth 4 and transferred to froth treatment vessel 7.

Coarse tailings 5 comprising sand, clay fines and water are combined with froth treatment tailings 9 and fine tailings 10 to provide combined tailings stream 11 and transferred to separator 12.

Optionally, a metal compound and/or a low molecular weight cationic organic polymer (MC/P), polyacrylamide (PAM) and polysilicate microgel (PSM) are added to combined tailings stream in separator 12. Combined tailings stream 11 is allowed to settle in separator 12. Solids 13 comprising sand and clay fines are separated from water 14. Solids 13 are transferred to tailings pond. Water 14 may be recycled, such as by transferring to mixing vessel 3 for re-use.

EXAMPLES

Materials and Test Methods

Materials

Mature fine tailings used in the following examples were obtained from an oil sands processor in Alberta, Canada. The solids concentrations were 29.2 to 29.9% on a weight basis. The mature fine tailings had a median particle size of 12.95 µm and a mean particle size of 20.9 µm and 100% of the particles are finer than 0.05 mm. Yield stress measurements of the samples were obtained by using a Brookfield rheometer equipped with a vane spindle and results were reported in Pa (pascals). The sodium silicate ratio used in the following examples had a ratio of 3.22 $SiO_2:Na_2O$.

Examples 1-3

Examples 1 though 3 illustrate the increase in yield stress by addition of sodium silicate and an activator. The mature fine tailings (1000 g) were at 29.9 wt % solids, pH 7.98, and had an initial yield stress of 3.7. The mature fine tailings were mixed in a reactor at 600 rpm with a propeller mixer while the activator, carbon dioxide (6 psi), was bubbled through a fitted disk. After 10 minutes, the pH was 6.35. Carbon dioxide was continued to be bubbled through the mature fine tailings for an additional 60 minutes. The pH was measured again and was 6.35. The mature fine tailings were then split into 3 portions and used for Examples 1-3.

Example 1

Example 1 illustrates the effects of sodium silicate on mature fine tailings. Carbon dioxide saturated mature fine tailings (200 g) and sodium silicate (1.18 g, 3.22 ratio sodium silicate) were mixed in a 100 mL Tripour beaker for 30 minutes. After 30 minutes of standing, the pH of the mixture was 7.42. The yield stress was measured at 30 minutes, 18 hours, and 6 days. Results are listed in Table 1.

Example 2

Example 2 illustrates the effects of sodium silicate and an alkaline earth metal salt on yield stress. Carbon dioxide saturated mature fine tailings (200 g), sodium silicate (1.18 g, 3.22 ratio sodium silicate), and calcium sulfate (0.22 g) were mixed in a 100 mL Tripour beaker for 30 minutes. After 30 minutes of standing, the pH of the mixture was 7.78. The yield stress was measured at 30 minutes, 18 hours, and 6 days. Results are listed in Table 1.

Example 3

Example 3 illustrates the effects of increased sodium silicate on yield stress. Carbon dioxide saturated mature fine tailings (200 g), sodium silicate (2.36, 3.22 ratio sodium silicate), and calcium sulfate (0.22 g) were mixed in a 100 mL Tripour beaker for 30 minutes. After 30 minutes of standing, the pH of the mixture was 8.72. The yield stress was measured at 30 minutes, 18 hours, and 6 days. Results are listed in Table 1.

TABLE 1

|  | Example 1 | Example 2 | Example 3 |
| --- | --- | --- | --- |
| Sodium silicate (g) | 1.18 | 1.18 | 2.36 |
| $CaSO_4$ (g) | 0 | 0.22 | 0 |
| pH | 7.42 | 7.78 | 8.72 |
| Yield stress (Pa) | | | |
| After 30 minutes | 184 | 198 | 21 |
| After 18 hours | 458 | 435 | 128 |
| After 6 days | 1282 | 1117 | 1165 |

As can be seen in Table 1, the yield stress was increased by the addition of sodium silicate and optionally calcium sulfate over time. Example 1 contained only sodium silicate and $CO_2$ as the activator. Examples 2 contained sodium silicate and both $CO_2$ and calcium sulfate. Example 2 had similar yield stress over the time tested. Example 3 contained sodium silicate and both $CO_2$ and calcium sulfate. Example 3 illustrates the effect of increased sodium silicate resulting in an increased pH. The initial 30 minute and 18 hour yield stress measurements showed significantly lower yield stress but the 6 day yield stress measurement remained consistent with Examples 1 and 2. This is beneficial if immediate hardening of the treated mature fine tailings was not desired. The increase in pH slows the gel rate of the mixture allowing for a longer period of time for fluidity.

Example 4

Example 4 illustrates the effect of addition of sodium silicate and an organic compound on yield stress. Mature fine tailings (29.9 wt %, pH 7.98, yield stress of 3.7), sodium silicate (21.60 g) and ethyl acetate (4.12 g) were mixed in a 100 mL Tripour beaker. The beaker was stored for 20 hours. After 20 hours, the yield stress was 896 Pa.

Example 5-7

Examples 5 though 7 illustrate the effect of gel time and weight loss by contacting the mature fine tailings with sodium silicate and calcium salts.

Example 5

Mature fine tailings (100 g, 29.2 wt % solids) were mixed with sodium silicate (1.25 g) in a 100 mL Tripour beaker, and the final pH was adjusted with sulfuric acid to pH 7. The resulting mixture was then tested for weight loss after storing at 120 hours, 168 hours, 192 hours, and 264 hours. Results are listed in Table 2.

Example 6

Mature fine tailings (100 g, 29.2 wt % solids) were mixed with sodium silicate (1.25 g) in a 100 mL Tripour beaker, and the final pH was adjusted with sulfuric acid to pH 7. Calcium chloride (1.78 g) was added and mixed thoroughly. The resulting mixture had a pH of 7.1 and was tested for weight loss after storing at 120 hours, 168 hours, 192 hours, and 264 hours. Results are listed in Table 2.

Example 7

Mature fine tailings (100 g, 29.2% wt solids) were mixed with sodium silicate (1.25 g) in a 100 mL Tripour beaker, and the final pH was adjusted with sulfuric acid to pH 7. Calcium sulfate (1.6 g) was added and mixed thoroughly. The resulting mixture had a pH of 7.22 and was tested for weight loss after storing at 120 hours, 168 hours, 192 hours, and 264 hours. Results are listed in Table 2.

As can be seen in Table 2, the gel times can be adjusted by addition of calcium salts. The addition of calcium salts provide for immediate gel times when compared to a mixture with no salt added. The resulting weight losses were similar for all three.

TABLE 2

|  | Example 5 | Example 6 | Example 7 |
|---|---|---|---|
| $CaCl_2$ (g) | 0 | 1.78 | 0 |
| $CaSO_4$ (g) | 0 | 0 | 1.6 |
| Gel time | 30 minutes | Instant | Instant |
| Weight loss (g) | | | |
| After 120 hours | 12.5 | 12.5 | 13.5 |
| After 168 hours | 21.2 | 21.4 | 22.9 |
| After 192 hours | 23.9 | 24.2 | 25.9 |
| After 264 hours | 32.2 | 33.0 | 35.4 |

Examples 8-11

Examples 8 though 11 illustrate the gelling of the mature fine tailings with calcium salts without the addition of an acid to adjust pH.

Example 8

Mature fine tailings (100 g, 29.2 wt % solids) were mixed with sodium silicate (1.25 g) in a 100 mL Tripour beaker, and the final pH was recorded in Table 3. Calcium chloride (3.56 g) was added and mixed thoroughly. The resulting mixture had a pH of 7.15 and was tested for gel time and weight loss after storing at 120 hours, 168 hours, 192 hours, and 264 hours. Results are listed in Table 3.

Example 9

Mature fine tailings (100 g, 29.2 wt % solids) were mixed with sodium silicate (1.25 g) in a 100 mL Tripour beaker, and the final pH was recorded in Table 3. Calcium sulfate (3.2 g) was added and mixed thoroughly. The resulting mixture had a pH of 9.91 and was tested for gel time and weight loss after storing at 120 hours, 168 hours, 192 hours, and 264 hours. Results are listed in Table 3.

Example 10

Mature fine tailings (100 g, 29.2 wt % solids) were mixed with sodium silicate (1.25 g) in a 100 mL Tripour beaker, and the final pH was recorded in Table 3. Calcium chloride (1.78 g) was added and mixed thoroughly. The resulting mixture had a pH of 7.15 and was tested for gel time and weight loss after storing at 120 hours, 168 hours, 192 hours, and 264 hours. Results are listed in Table 3.

Example 11

Mature fine tailings (100 g, 29.2 wt % solids) were mixed with sodium silicate (1.25 g) in a 100 mL Tripour beaker, and the final pH was recorded in Table 3. Calcium sulfate (1.6 g) was added and mixed thoroughly. The resulting mixture had a pH of 7.15 and was then tested for gel time and weight loss at after storing 120 hours, 168 hours, 192 hours, and 264 hours. Results are listed in Table 3.

As can be seen in Table 3, mature fine tailings can be gelled with sodium silicates and calcium salts and without pH adjustments. Weight loss amounts are comparable to Examples 5-7, where the pH was adjusted.

TABLE 3

|  | Example 8 | Example 9 | Example 10 | Example 11 |
|---|---|---|---|---|
| $CaCl_2$ (g) | 3.56 | 0 | 1.78 | 0 |
| $CaSO_4$ (g) | 0 | 3.2 | 0 | 1.6 |
| Gel time | ** | Instant | ** | 30 minutes |
| pH | 7.15 | 9.91 | 8.06 | 9.97 |
| Weight loss (g) | | | | |
| After 120 hrs | 16.8 | 18.1 | 17.9 | 14.4 |
| After 168 hrs | 25.3 | 28.3 | 28.1 | 24.1 |
| After 192 hrs | 27.9 | 31.2 | 29.4 | 26.9 |
| After 264 hrs | 36 | 39.6 | 37.3 | 35.4 |

** gel time could not be determined due to water was exuded to the surface

Examples 12-18

Examples 12 through 18 demonstrate weight loss over time of pH adjusted mature fine tailing solution with varying amounts of sodium silicate and calcium sulfate.

Example 12

Mature fine tailings (450 g, 29.2 wt % solids) were added to a beaker. The pH was adjusted with sulfuric acid to pH 7. Sodium silicate (5.63 g) and calcium sulfate (0.90 g) were added to the beaker. The mixture was split into 4 separate 100 mL Tripour beakers. Two of the beakers (12a and 12b) were placed in a laboratory hood and two beakers (12c and 12d) were stored on a normal laboratory bench. The weight loss was measured at 2 days, 3 days, ad 6 days. Results are listed as an average of the samples (samples a and b were averaged for the hood samples and samples c and d were averaged for the bench samples) in Table 4.

Example 13

Example 13 is a repeat of Example 12 with reduced concentration of calcium sulfate (0.45 g). Results are listed in Table 4.

Example 14

Example 14 is a repeat of Example 12 with reduced concentration of calcium sulfate (0.23 g). Results are listed in Table 4.

Example 15

Example 15 is a repeat of Example 12 with reduced concentration of sodium silicate (2.80 g). Results are listed in Table 4.

Example 16

Example 16 is a repeat of Example 15 with reduced concentration of calcium sulfate (0.45 g). Results are listed in Table 4.

Example 17

Example 17 is a repeat of Example 12 with reduced concentration of sodium silicate (1.40 g). Results are listed in Table 4.

Example 18

Example 18 is a repeat of Example 17 with reduced concentration of calcium sulfate (0.45 g). Results are listed in Table 4.

Example 19

Example 19 is a repeat of Example 14 with the addition of gypsum (0.23 g) prior to the addition of sodium silicate.

Comparative Example A

Comparative Example A is a water sample split into 4 samples. The samples were exposed to the same conditions as Example 12 with 2 samples averaged for the hood and 2 samples averaged for the bench test. Results are listed in Table 4.

As seen in Table 4, various amounts of sodium silicate and calcium sulfate can be used in the present invention with excellent results. Surprisingly, when adding the sodium silicate and calcium sulfates, weight loss was increased compared to the water sample when exposed to the same air conditions.

Example 20

Example 20 demonstrates an increase in yield stress of mature fine tailings and sand mixture with sodium silicate, and two activators. Mature fine tailings (100 g, 29.9 wt % solids) with a pH of 7.98 and a yield stress of 3.7 Pa were added to a beaker. Sand (200 g, obtained from an oil sands processor in Alberta, Canada) was added to the beaker. Sodium silicate (1.25 g) was added to the beaker. The pH of the mixture was adjusted to pH 7 with sulfuric acid. Calcium sulfate (0.2 g) was added to the mixture the mixture was stirred. The pH of the final mixture was 6.83. Yield stress was measured after 1 hour and 3 hours. Results are listed in Table 5.

Comparative Example B

Comparative Example B demonstrates the yield stress of a mature fine tailings and sand mixture. Mature fine tailings (100 g, 29.9 wt % solids) with a pH of 7.98 and a yield stress of 3.7 Pa were added to a beaker. Sand (200 g, obtained from an oil sands processor in Alberta, Canada) was added to the beaker. The pH of the final mixture was 8.21. Yield stress was measured after 1 hour and 3 hours. Results are listed in Table 5.

Comparative Example C

Comparative Example C demonstrates the yield stress of a mature fine tailings and sand mixture adjusted with acid to pH 7 without addition of sodium silicate. Mature fine tailings (100 g, 29.9% wt solids) with a pH of 7.98 and a yield stress of 3.7 Pa were added to a beaker. Sand (200 g, obtained from an oil sands processor in Alberta, Canada) was added to the beaker. The pH of the mixture was adjusted with sulfuric acid to 7. Yield stress was measured after 1 hour and 3 hours. Results are listed in Table 5.

Comparative Example D

Comparative Example D demonstrates the yield stress of a mature fine tailings and sand mixture adjusted with acid to a pH of 7 and additional calcium salt added without the addition of sodium silicate. Mature fine tailings (100 g, 29.9% wt solids) with a pH of 7.98 and a yield stress of 3.7 Pa were added to a beaker. Sand (200 g, obtained from an oil sands processor in Alberta, Canada) was added to the beaker. The pH of the mixture was adjusted to a pH of 7 with sulfuric acid. Calcium sulfate (0.2 g) was added to the mixture the mixture was stirred. The pH of the final mixture

TABLE 4

|  | Ex. 12 | Ex. 13 | Ex. 14 | Ex. 15 | Ex. 16 | Ex. 17 | Ex. 18 | Ex. 19[#] | Comp. Ex. A[*] |
|---|---|---|---|---|---|---|---|---|---|
| Sodium silicate (g) | 5.63 | 5.63 | 5.63 | 2.80 | 2.80 | 1.40 | 1.40 | 5.63 | 0 |
| $CaSO_4$ (g) | 0.90 | 0.45 | 0.23 | 0.90 | 0.45 | 0.90 | 0.45 | 0.23 | 0 |
| Weight loss (g) | | | | | | | | | |
| 2 days - hood | 22.6 | 21.2 | 20.6 | 20.0 | 24.7 | 22.8 | 22.1 | 30.25 | 18.5 |
| 3 days - hood | 36.4 | 33.7 | 30.1 | 33.8 | 33.45 | 32.2 | 30.7 | 40.1 | 24.9 |
| 6 days - hood | 68.9 | 65.9 | 60.5 | 64.6 | 67.6 | 66.9 | 66.4 | 67.6 | 44.2 |
| 2 days - bench | 7.6 | 6.5 | 6.7 | 6.4 | 6.35 | 6.15 | 6.0 | 6.2 | 4.8 |
| 3 days - bench | 10.6 | 9.4 | 9.6 | 9.2 | 9.45 | 8.9 | 8.6 | 9.4 | 7.0 |
| 6 days - bench | 20.2 | 18.7 | 19.0 | 18.8 | 19.2 | 17.7 | 17.5 | 18.8 | 13.7 |

[#]denotes a sample where gypsum was added and the sample pH was adjust after all reactants were added
[*]denotes water sample was 6.93. Yield stress was measured after 1 hour and 3 hours. Results are listed in Table 5.

As can be seen in Table 5, Example 20 shows that by treating mature fine tailings and sand mixture with sodium silicate, adjusting pH to 7, then adding calcium sulfate, the yield stress can be increased significantly (an order of magnitude or greater). Untreated mixtures of mature fine tailings and sand have low yield stress. Mature fine tailings and sand mixtures where the pH was adjust to 7 also showed the same low yield stress measurements as the untreated mixtures. Mixtures of mature fine tailings and sand, with the pH adjusted to 7, then had calcium sulfate added, had an increase in yield stress, but still is significantly lower than the Example 20.

TABLE 5

|  | Example 20 | Comparative Example B | Comparative Example C | Comparative Example D |
| --- | --- | --- | --- | --- |
| Sodium silicate (g) | 1.25 | 0 | 0 | 0 |
| pH adjusted to 7 | Yes | No | Yes | Yes |
| CaSO$_4$ (g) | 0.2 | 0 | 0 | 0.2 |
| Final pH | 6.83 | 8.2 | 7.0 | 6.93 |
| Yield Stress (Pa) | | | | |
| 1 hour | 1485 | 34 | 32 | 106 |
| 3 hours | >1760 | 30 | 32 | 179 |

Example 21

Example 21 demonstrates the effect on gel time for mature fine tailings and sodium silicate mixture adjusted with acid to pH 8. Mature fine tailings (220 g, 29.9% wt solids) with a pH of 7.98 were added to a beaker. Sodium silicate (2.75 g) was added to the beaker. The pH of the mixture was adjusted to pH 8.03 with sulfuric acid (0.5 N). The mixture gelled.

Example 22

Example 22 demonstrates the effect on gel time for a mature fine tailings and sodium silicate mixture adjusted with acid to pH 9. Mature fine tailings (220 g, 29.9% wt solids) with a pH of 7.98 were added to a beaker. Sodium silicate (2.75 g) was added to the beaker. The pH of the mixture was adjusted to a pH of 9.01 with sulfuric acid (0.5 N). The mixture was still fluid after 24 hours but gelled after 2 weeks.

Examples 21 and 22 show that by reducing the amount of activator addition, the gel formation can be prolonged for up to several days.

Example 23

Example 23 demonstrates the effect of the addition of sodium silicate to mature fine tailings without the addition of an activator. Mature fine tailings (220 g, 29.9% wt solids) with a pH of 7.98 were added to a beaker. Sodium silicate (2.75 g) was added to the beaker. The pH of the mixture was not adjusted. A bottom layer of solids formed after a few hours. The resulting solids concentration suspended was 16.3%.

Example 24

Example 24 demonstrates the effect of the addition of sodium silicate to mature fine tailings, pH adjusted to 11, without the addition of an activator. Mature fine tailings (220 g, 29.9% wt solids) with a pH of 7.98 were added to a beaker. Mature fine tailings (220 g, 29.9% wt solids) with a pH of 7.98 were added to a beaker. Sodium silicate (2.75 g) was added to the beaker. The pH of the mixture was adjusted to 11.03 with sodium hydroxide (1N). A bottom layer of solids formed after a few hours. The resulting solids concentration suspended was 15.6%.

Example 25

Example 25 demonstrates the effect of the addition of sodium silicate to mature fine tailings, pH adjusted to 12, without the addition of an activator. Mature fine tailings (220 g, 29.9 wt % solids) with a pH of 7.98 were added to a beaker. Sodium silicate (2.75 g) was added to the beaker. The pH of the mixture was adjusted to 12.01 with sodium hydroxide (1N). A bottom layer of solids formed after a few hours. The resulting solids concentration suspended was 15.5%.

By adding only sodium silicate, as shown in Example 23, the mature fine tailing can be modified to have a lower solids concentration compared to untreated mature fine tailings. The product is a reduced solids concentration mixture without gelling of the product. For Examples 24 and 25 show that elevated pH will also result in a reduce solids concentrated mixture without producing a gelled product. A bitumen layer was evident on the surface of the silicate treated tailings in Examples 22, 23, 24, and 25.

What is claimed is:

1. A process for treating a tailings stream comprising water, fine clays and sands, the process comprising (a) contacting a silicate source and an activator with said tailings stream, (b) entrapping fine clay and sand within a silica gel, wherein said silica gel is formed from said silicate source and said activator, (c) spreading the silica gel over a surface, and (d) allowing the silica gel to dry by releasing liquid water to produce a trafficable surface, wherein the silicate source is an alkali metal silicate, polysilicate microgel, or combinations thereof, wherein the released liquid water is recycled and wherein 20% by volume to about 100% by volume of the fine clays and sand have a particle size less than 0.05 mm.

2. A process according to claim 1, wherein the activator is an acid, alkaline earth metal salt, aluminum salt, organic ester, dialdehyde, organic carbonate, organic phosphate, amide, or a combination thereof.

3. A process according to claim 2, wherein the activator is an acid and the acid is sulfuric acid, carbon dioxide, phosphoric acid, sodium phosphate, sodium bicarbonate, hydrochloric acid, sodium hydrogen sulfate, acetic acid or a combination thereof.

4. A process according to claim 2 wherein the activator is an acetic ester of glycerol, glyoxal, ethylene carbonate, propylene carbonate, formamide, or a combination thereof.

5. A process according to claim 2 wherein the activator is an alkaline earth metal salt or an aluminum salt and is calcium chloride, calcium oxide, calcium carbonate, calcium sulfate, magnesium sulfate, magnesium chloride, aluminum sulfate, or sodium aluminate.

6. A process according to claim 2 wherein the activator is an acid or an alkaline earth metal salt.

7. A process according to claim 6 wherein the activator is an acid and the acid is sulfuric acid or carbon dioxide.

8. A process according to claim 6 wherein the activator is an alkaline earth metal salt and the salt is calcium sulfate or calcium chloride.

9. A process according claim 2, wherein two or more activators are used.

10. A process according to claim 1, wherein the tailings stream is from a tailings pond.

11. A process according to claim 1, wherein the tailings stream is a fresh tailings from a bitumen recovery process.

12. A process according to claim 1, wherein the silicate source, the activator and the tailings stream are centrifuged between step (a) and step (b).

13. A process according to claim 1 wherein the surface is sloped.

14. A process according to claim 1 wherein the silicate source, activator, and tailings stream are combined in a transfer line prior to being spread on a surface and allowed to dry.

* * * * *